United States Patent
Tai et al.

(10) Patent No.: US 11,317,040 B2
(45) Date of Patent: Apr. 26, 2022

(54) IMAGE SENSING APPARATUS

(71) Applicant: Shanghai Harvest Intelligence Technology Co., Ltd., Shanghai (CN)

(72) Inventors: YA-Hsiang Tai, Shanghai (CN); Chung-Wen Lai, Shanghai (CN)

(73) Assignee: Shanghai Harvest Intelligence Technology Co., Ltd., Shanghai (CN)

( * ) Notice: Subject to any disclaimer, the term of this patent is extended or adjusted under 35 U.S.C. 154(b) by 0 days.

(21) Appl. No.: 16/909,732

(22) Filed: Jun. 23, 2020

(65) Prior Publication Data

US 2020/0412985 A1     Dec. 31, 2020

(30) Foreign Application Priority Data

Jun. 25, 2019 (CN) .......................... 201910555586.0
Jun. 25, 2019 (CN) .......................... 201910555675.5
Jun. 25, 2019 (CN) .......................... 201910556491.0

(51) Int. Cl.
*H04N 5/355*        (2011.01)
*H04N 5/3745*       (2011.01)

(52) U.S. Cl.
CPC ........... *H04N 5/355* (2013.01); *H04N 5/3745* (2013.01)

(58) Field of Classification Search
CPC .............................. H04N 5/355; H04N 5/3745
See application file for complete search history.

(56) References Cited

U.S. PATENT DOCUMENTS

| | | | |
|---|---|---|---|
| 10,609,300 B2 | 3/2020 | Feng et al. | |
| 2004/0252867 A1* | 12/2004 | Lan .................... | G06K 9/0004 382/124 |
| 2008/0246856 A1 | 10/2008 | Shibuya et al. | |
| 2011/0181254 A1* | 7/2011 | Ritter ................. | G01S 17/08 323/234 |
| 2013/0119237 A1* | 5/2013 | Raguin ............. | H01L 27/14601 250/208.1 |
| 2014/0055635 A1 | 2/2014 | Seo | |
| 2019/0104247 A1 | 4/2019 | Feng et al. | |

FOREIGN PATENT DOCUMENTS

| | | |
|---|---|---|
| CN | 107005685 A | 8/2017 |
| CN | 107580185 A | 1/2018 |

OTHER PUBLICATIONS

First Chinese Office Action regarding Application No. 201910555675.5 dated Jun. 25, 2021 .English translation provided by Unitalen Attorneys at Law.

* cited by examiner

*Primary Examiner* — Ahmed A Berhan
(74) *Attorney, Agent, or Firm* — Harness, Dickey & Pierce, P.L.C.

(57) ABSTRACT

The present disclosure provides an image sensing apparatus, including: a substrate; a plurality of pixels disposed in an array on the substrate, wherein each pixel includes a first photosensitive element and a pixel switch, and the first photosensitive element is configured to generate a first electrical signal including signal light information and ambient light information; and an environment sensor including at least one second photosensitive element, wherein the at least one second photosensitive element is configured to generate a second electrical signal including ambient light information. The image sensing apparatus according to embodiments of the present disclosure can effectively eliminate the influence of ambient light on the image capturing and improve the imaging quality.

26 Claims, 9 Drawing Sheets

$I_1$ - First electrical signal
$I_2, I_3, I_4, I_5$ - Second electrical signal
$I_6$ - Preprocessed second electrical signal
$I_{out}$ - Third electrical signal $I_1$ - First electrical signal
$I_2, I_3, I_4, I_5$ - Second electrical signal
$I_6$ - Preprocessed second electrical signal
$I_{out}$ - Third electrical signal $I_1$ - First electrical signal
$I_2, I_3, I_4, I_5$ - Second electrical signal
$I_6$ - Preprocessed second electrical signal
$I_{out}$ - Third electrical signal $I_1$ -First electrical signal
$I_2$ -Second electrical signal
$I_{out}$ -Third electrical signal

IMAGE SENSING APPARATUS

CROSS-REFERENCE TO RELATED APPLICATIONS

The present application claims the benefit of priority to Chinese patent application No. 201910556491.0, filed on Jun. 25, 2019, Chinese patent application No. 201910555586.0, filed on Jun. 25, 2019, and Chinese patent application No. 201910555675.5, filed on Jun. 25, 2019, the entire disclosures of which are incorporated herein by reference.

TECHNICAL FIELD

The present disclosure relates to the technical field of image sensor, and more particular to an image sensing apparatus.

BACKGROUND

Image sensors apply a photoelectric conversion function of a photosensitive element to convert a light image on a photosensitive surface into an electrical signal in a proportional relationship with the light image.

For example, an optical fingerprint sensor usually includes a pixel array, and each pixel in the pixel array has a photosensitive element to realize the conversion of a light signal to an electrical signal.

At present, the image sensors are continuously developing in the trend of large size, high resolution, high imaging quality and low cost. In addition, in recent years, the vigorous development of artificial intelligence has made the information obtained by image more important, which puts higher requirements on the resolution and imaging quality of the image sensors.

Existing photoelectric devices applied in image sensors are usually photodiodes, which is easy to be affected by ambient light and other interference factors, resulting in poor imaging quality.

SUMMARY

Embodiments of the present disclosure provide an image sensing apparatus, which can effectively eliminate the influence of ambient light on the image capturing and improve the imaging quality.

Embodiments of the present disclosure provide an image sensing apparatus, including: a substrate; a plurality of pixels disposed in an array on the substrate, wherein each pixel includes a first photosensitive element and a pixel switch, and the first photosensitive element is configured to generate a first electrical signal including signal light information and ambient light information; and an environment sensor including at least one second photosensitive element, wherein the at least one second photosensitive element is configured to generate a second electrical signal including ambient light information.

In some embodiments, the substrate includes a first area and a second area on a same surface, the plurality of pixels are disposed in the first area, and the at least one second photosensitive element is disposed in the second area.

In some embodiments, the image sensing apparatus further includes: a plurality of data lines, wherein each data line is coupled with the pixels in a same row, and the first electrical signal generated by the first photosensitive element in each pixel is transmitted to the data line via the pixel switch.

In some embodiments, there is a correspondence relationship between the plurality of data lines and the at least one second photosensitive element, each data line and its corresponding second photosensitive element are coupled with a same port of an external control unit, and a signal received by the same port of the external control unit is a superimposed signal of the first electrical signal and at least a part of the second electrical signal.

In some embodiments, different data lines are coupled with different ports of the external control unit.

In some embodiments, the at least one second photosensitive element is in one-to-one correspondence with the plurality of data lines, and the signal received by the same port of the external control unit is a superimposed signal of the first electrical signal and the second electrical signal.

In some embodiments, a photosensitive area of the first photosensitive element is the same as a photosensitive area of the second photosensitive element corresponding to the same data line.

In some embodiments, each second photosensitive element corresponds to x data lines, and the signal received by the same port of the external control unit is a superimposed signal of the first electrical signal and 1/x of the second electrical signal.

In some embodiments, a photosensitive area of each second photosensitive element is a product of a photosensitive area of the first photosensitive element and the number of the plurality of data lines corresponding to each second photosensitive element.

In some embodiments, the second area is disposed at one side of the first area.

In some embodiments, the second area surrounds the first area.

In some embodiments, the at least one second photosensitive element is uniformly distributed in the second area.

In some embodiments, the environment sensor comprises an even number of second photosensitive elements, and the even number of second photosensitive elements are axially symmetrically distributed with respect to a center line of the second area; or the second area and the first area are n-polygon, the at least one second photosensitive element is disposed on each vertex of the n-polygon, and n is a positive integer greater than 2.

In some embodiments, each pixel further includes a first buffer and a first amplifier coupled with the first photosensitive element to buffer and amplify the first electrical signal.

In some embodiments, the environment sensor further includes a second buffer and a second amplifier coupled with the at least one second photosensitive element to buffer and amplify the second electrical signal.

In some embodiments, the image sensing apparatus further includes: an external control unit configured to receive the first electrical signal and the second electrical signal and to obtain a third electrical signal according to the first electrical signal and the second electrical signal, wherein the third electrical signal represents the signal light information.

In some embodiments, the image sensing apparatus further includes: a plurality of data lines, wherein each data line is coupled with the pixels in a same row, and the first electrical signal generated by the first photosensitive element in each pixel is transmitted to the data line via the pixel switch, and an output end of each data line is coupled with the external control unit.

In some embodiments, the at least one second photosensitive element is respectively coupled with the external control unit.

In some embodiments, the external control unit and the environment sensor are formed on a same chip.

In some embodiments, the external control unit is disposed at a preset distance from the substrate.

In some embodiments, the external control unit and the environment sensor are formed on different chips.

In some embodiments, the external control unit obtaining the third electrical signal according to the first electrical signal and the second electrical signal includes: receiving the first electrical signal; receiving the second electrical signal; correcting the second electrical signal to obtain a fourth electrical signal; and determining a difference between the first electrical signal and the fourth electrical signal as the third electrical signal.

In some embodiments, correcting the second electrical signal to obtain the fourth electrical signal includes: determining the fourth electrical signal according to a proportional relationship between a photosensitive area of the at least one second photosensitive element and a photosensitive area of the first photosensitive element, and the second electrical signal.

In some embodiments, the environment sensor includes a plurality of second photosensitive elements, and correcting the second electrical signal to obtain the fourth electrical signal includes: generating a preprocessed second electrical signal based on a plurality of second electrical signals generated by the plurality of second photosensitive elements; and determining the fourth electrical signal according to a proportional relationship between a photosensitive area of the second photosensitive elements and a photosensitive area of the first photosensitive element, and the preprocessed second electrical signal.

In some embodiments, generating the preprocessed second electrical signal based on the second electrical signal generated by each second photosensitive element includes: determining an average value of the plurality of second electrical signals as the preprocessed second electrical signal; or, determining a minimum value among the plurality of second electrical signals as the preprocessed second electrical signal; or, determining the second electrical signal with a highest probability of occurrence among the plurality of second electrical signals as the preprocessed second electrical signal.

In some embodiments, the external control unit further includes at least one current source configured for receiving the fourth electrical signal.

In some embodiments, the image sensing apparatus further includes: a plurality of data lines, wherein each data line is couple with the pixels in a same row, the first electrical signal generated by the first photosensitive element in each pixel is transmitted to the data line via the pixel switch, and an output end of each data line is coupled with a port of the external control unit, and wherein the at least one current source is in one-to-one correspondence with the plurality of data lines to receive the first electrical signal transmitted by corresponding data line, and an optical current output by each data line to corresponding port is a superimposed signal of corresponding first electrical signal and the fourth electrical signal received by corresponding current source.

Compared with conventional technologies, embodiments of the present disclosure have following beneficial effects.

According to embodiments of the present disclosure, the image sensing apparatus includes: a substrate; a plurality of pixels disposed in an array on the substrate, wherein each pixel includes a first photosensitive element and a pixel switch, and the first photosensitive element is configured to generate a first electrical signal including signal light information and ambient light information; and an environment sensor including at least one second photosensitive element, wherein the at least one second photosensitive element is configured to generate a second electrical signal including the ambient light information. Compared with existing image sensing apparatus, the image sensing apparatus according to the embodiments of the present disclosure can effectively eliminate the influence of ambient light on the image capturing and improve the image quality.

Further, the substrate includes a first area and a second area on a same surface, the plurality of pixels are disposed in the first area, and the at least one second photosensitive element is disposed in the second area. By making full use of a margin area outside the area where a pixel array is located on the substrate and disposing the at least one second photosensitive element for collecting the ambient light in the margin area, imaging results of the pixel array can be corrected to effectively suppress the influence of the ambient light on the imaging results of the pixel array.

Further, each data line and the corresponding second photosensitive element are coupled with the same port of the external control unit, and the signal received by the same port of the external control unit is the superimposed signal of the first electrical signal and at least a part of the second electrical signal. Thus, an output signal of the image sensing apparatus is the superimposed signal, and the external control unit can directly obtain a corrected image signal without additional calculation or signal processing, which is beneficial to improve the compatibility of the image sensing apparatus.

Further, the at least one second photosensitive element is uniformly distributed in the second area to uniformly collect the ambient light signals at each point of the image sensing apparatus. As a result, the ambient light deducted from the third electrical signal can be much closer to the actual ambient light of the environment where the image sensing apparatus is located, which is beneficial to improve the imaging quality.

Further, the external control unit and the environment sensor are integrated on the same semiconductor chip. Without changing the device structures integrated on the substrate, the environment sensor is disposed on the chip outside the substrate where the external control unit is located to collect the ambient light separately, so as to correct the first electrical signal output by image sensor assemblies on the substrate, thereby suppressing the influence of the ambient light on the image captured by the image sensing apparatus and obtaining an image of higher quality. The image sensing apparatus according to the embodiments of the present disclosure can be compatible with existing image sensors, without making additional change to the image sensors, thus the implementation cost is relatively low.

BRIEF DESCRIPTION OF THE DRAWINGS

Other features and advantages of the present disclosure will be better understood by the following alternative embodiments described in detail in connection with the accompanying drawings, in which the same reference numeral identifies the same or similar parts, wherein.

DETAILED DESCRIPTION

As mentioned in the background, existing photoelectric devices applied in image sensors are usually photodiodes, which is easy to be affected by ambient light and other interference factors, resulting in poor imaging quality.

An embodiment of the present disclosure provides an image sensing apparatus including: a substrate; a plurality of pixels disposed in an array on the substrate, wherein each pixel includes a first photosensitive element and a pixel switch, and the first photosensitive element is configured to generate a first electrical signal including signal light information and ambient light information; and an environment sensor including at least one second photosensitive element, wherein the at least one second photosensitive element is configured to generate a second electrical signal including ambient light information.

According to some embodiments of the present disclosure, the image sensing apparatus can effectively eliminate the influence of ambient light on the image capturing and improve the image quality. Specifically, by making full use of a margin area outside the area where a pixel array is located on the substrate and disposing the at least one second photosensitive element for collecting the ambient light in the margin area, imaging results of the pixel array can be corrected to effectively suppress the influence of the ambient light on the imaging results of the pixel array.

In order to make above objects, features and beneficial effects of the present disclosure more obvious and understandable, specific embodiments of the present disclosure will be described in details below in combination with the attached drawings.

Figure 1:
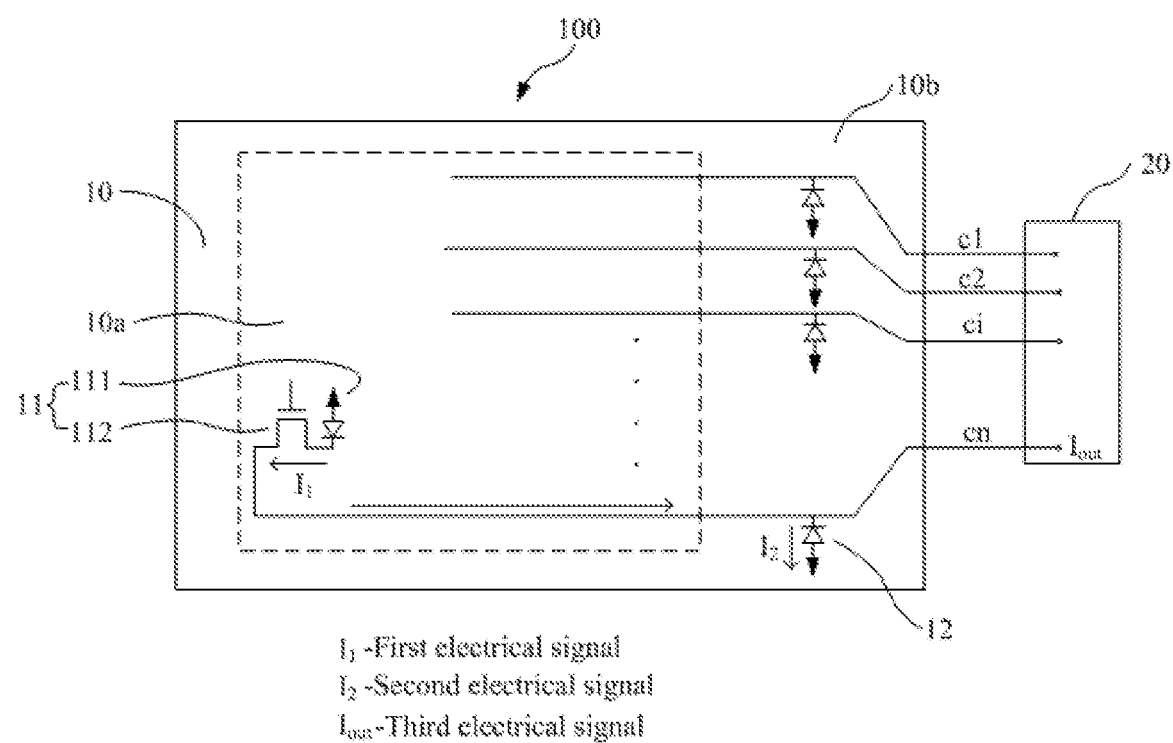
FIG. 1 shows a schematic view of an image sensing apparatus according to a first embodiment of the present disclosure.

FIG. 1 shows a schematic view of an image sensing apparatus 100 according to a first embodiment of the present disclosure.

The image sensing apparatus 100 according to this embodiment can be applied to an image capturing scene, such as an optical fingerprint capturing scene. For example, the image sensing apparatus 100 may be an optical fingerprint sensor.

In order to show structures more clearly, FIG. 1 shows a specific structure of a single pixel in a pixel array as an example.

Specifically, the image sensing apparatus 100 according to this embodiment may include: a substrate 10, a plurality of pixels 11 and an environment sensor. The plurality of pixels 11 are disposed in an array on the substrate 10, and each pixel 11 includes a first photosensitive element 111 and a pixel switch 112. The first photosensitive element 111 may be couple with the pixel switch 112 in series. The first photosensitive element 111 is configured to generate a first electrical signal, and the electrical signal includes signal light information and ambient light information. The environment sensor includes at least one second photosensitive element 12, and the at least one second photosensitive element 12 is configured to generate a second electrical signal including ambient light information.

In the embodiment shown in FIG. 1, the substrate 10 may include a first area 10a and a second area 10b distributed in parallel on a same surface. The plurality of pixels 11 are disposed in the first area 10a, and the second photosensitive element 12 is disposed in the second area 10b.

In some embodiments, the same surface may refer to the surface facing an object to be collected when capturing an image.

In some embodiments, the pixel switch 112 is usually a thin film transistor (TFT) device, and the photosensitive element is used to collect external input light signals and convert them into electrical signals, and then store them in corresponding pixels. In some embodiments, the light signal collected by the first photosensitive element 111 includes an ambient light signal and a signal light signal, and the collected light signal is converted into a first electrical signal and stored in the corresponding pixel 11. A light signal collected by the second photosensitive element 12 includes the ambient light signal, and the collected light signal is converted into a second electrical signal and output. In the optical fingerprint capturing scene, the signal light signal carries fingerprint information.

In some embodiments, the first photosensitive element 111 and the second photosensitive element 12 may be photodiodes. The photodiodes may include PIN junction amorphous silicon photodiode, PN junction amorphous silicon photodiode, PIN junction low-temperature polysilicon photodiode, PN junction low-temperature polysilicon photodiode, PIN junction organic photodiode, or PN junction organic photodiode, etc.

In some embodiments, the environment sensor includes m second photosensitive elements 12, and m is a positive integer. The image sensing apparatus 100 may also include n data lines (marked with c1 to cn in the figure), and each pixel 11 in the same row is coupled with a same data line ci. The first electrical signal generated by the first photosensitive element 111 in each pixel 11 is transmitted to the data line ci through the pixel switch 112, wherein n is a positive integer, $m \le n$, $1 \le i \le n$, and i is a positive integer.

In some embodiments, there is a correspondence relationship between the plurality of data lines and the at least one second photosensitive element 12, each data line ci and its corresponding second photosensitive element 12 are coupled with a same port of the external control unit 20, and the signal received by the same port of the external control unit 20 is a superimposed signal of the first electrical signal and at least a part of the second electrical signal, i.e., a third electrical signal, wherein a superimposition refers to an accumulation of signals with plus and minus. Different data lines are coupled with different ports of the external control unit 20.

For example, for each data line ci, a cathode of the first photosensitive element 111 and an anode of the corresponding second photosensitive element 12 may be coupled with the same port of the external control unit 20, or an anode of the first photosensitive element 111 and a cathode of the corresponding second photosensitive element 12 may be coupled with the same port of the external control unit 20, so the superimposed signal is the difference between the first electrical signal and at least a part of the second electrical signal. In other words, the output signal output by the image sensing apparatus 100 to the external control unit 20 is an imaging result after filtering out the ambient light signal. The external control unit 20 can directly obtain a corrected imaging signal without additional calculation or signal processing, which is beneficial to improve the compatibility of the image sensing apparatus 100.

In some embodiments, the at least one second photosensitive element 12 is in one-to-one correspondence with the data line ci, and the signal received by the same port of the external control unit 20 is the superimposed signal of the first electrical signal and the second electrical signal.

For example, referring to FIG. 1, each data line ci is provided with a corresponding second photosensitive element 12. In other words, the number of the at least one second photosensitive element 12 is the same as the number of the data line ci, that is, m=n. Thus, for each port of the external control unit 20, the superimposed signal received by the port is the difference between the first electrical signal of the pixel 11 coupled with the port and the second electrical signal of the second photosensitive element 12 coupled with the same port.

In some embodiments, a photosensitive area of the first photosensitive element 111 is the same as a photosensitive area of the second photosensitive element 12, where the first photosensitive element 111 and the second photosensitive element 12 correspond to the same data line. In other words, the first photosensitive element 111 and the second photosensitive element 12 may adopt photodiodes of the same specification to ensure that the photoelectric conversion efficiency of the external input light signal is consistent, so that the ambient light signal collected by the second photosensitive element 12 can basically offset the ambient light signal in the light signal collected by the first photosensitive element 111.

In some embodiments, the second area 10b may be located on the same side of the first area 10a. For example, referring to FIG. 1, the second area 10b may be located on one side of the first area 10a close to the external control unit 20, so as to optimize the circuit layout design on the substrate 10, save the wiring and reduce the cost.

From above, the solution of this embodiment can effectively eliminate the influence of the ambient light on the image capturing and improve the imaging quality. Specifically, by making full use of the margin area outside the area where the pixel array is located on the substrate and disposing the at least one second photosensitive element for collecting the ambient light in the margin area, imaging results of the pixel array are corrected to effectively suppress the influence of the ambient light on the imaging results of the pixel array.

In a variation example of the embodiment, for each second photosensitive element 12, the second photosensitive element 12 may correspond to x data lines ci, wherein x is a positive integer and x≤n. The signal received by the same port of the external control unit 2 is the superimposed signal of the first electrical signal and 1/x of the second electrical signal.

Taking x=2 as an example, for each second photosensitive element 12, the second photosensitive element 12 and two data lines ci may be respectively coupled with the same port of the external control unit 2. Accordingly, for each port of the external control unit 2, the superimposed signal received by the port is $I_1 - 1/2*I_2$, wherein $I_1$ is the first electrical signal collected by the first photosensitive element 111 coupled with the port, and $I_2$ is the second electrical signal collected by the second photosensitive element 12 coupled with the same port.

In some embodiments, for each second photosensitive element 12, the photosensitive area of the second photosensitive element 12 is a product of the photosensitive area of the first photosensitive element 111 and the number of the plurality of data lines ci corresponding to the second photosensitive element 12. That is to say, in some embodiments, since the same second photosensitive element 12 is respectively coupled with the ports of the external control unit 20 coupled with x data lines ci, the second electrical signal collected by the second photosensitive element 12 is shunted. To ensure that the second electrical signal after shunting at each port can basically offset the ambient light signal in the first electrical signal received by the port, the photosensitive area of the second photosensitive element 12 is appropriately increased to increase the second electrical signal of the second photosensitive element 12.

In some embodiments, x may be 1, that is, there is one second photosensitive element 12, and the photosensitive area of the second photosensitive element 12 is n times the number of the first photosensitive element 111.

In some embodiments, the number of the data lines ci corresponding to different second photosensitive elements 12 may be different, so as to make more reasonable use of the margin area outside the first area 10a on the substrate 10, which is beneficial to the miniaturization design of the image sensing apparatus 100.

Figure 2:
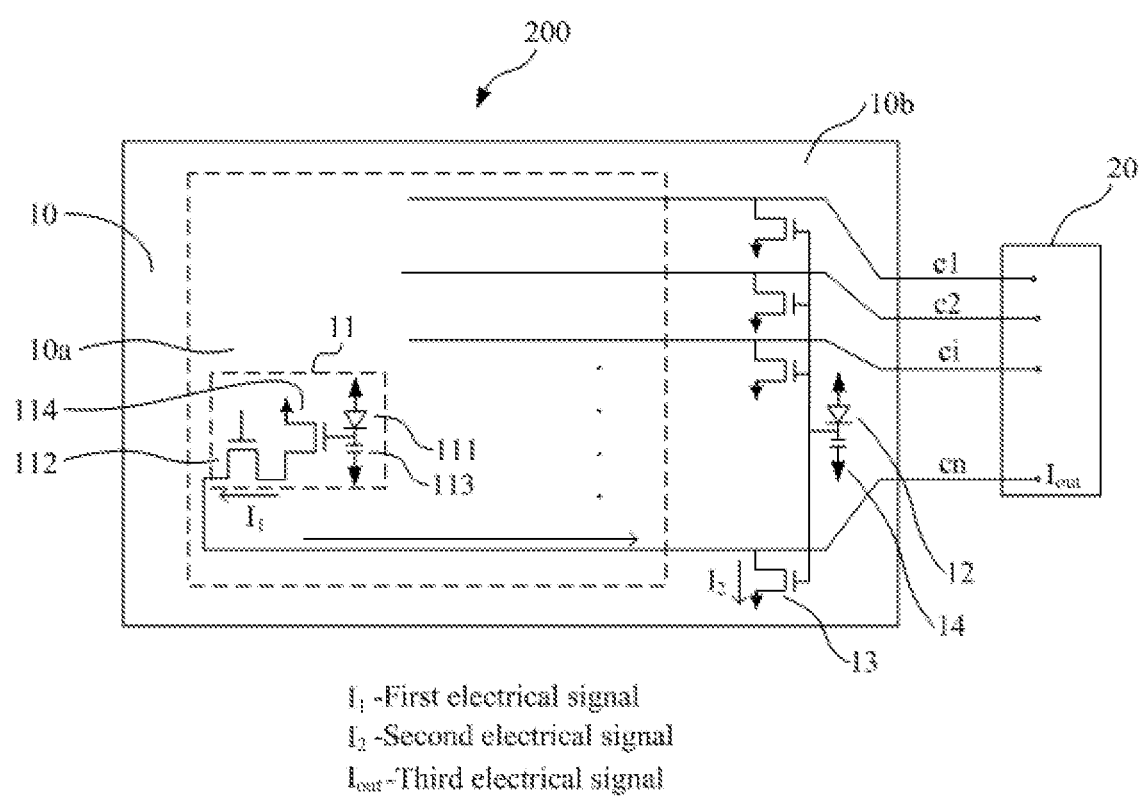
FIG. 2 shows a schematic view of an image sensing apparatus according to a second embodiment of the present disclosure.

FIG. 2 is a schematic view of an image sensing apparatus 200 according to a second embodiment of the present disclosure. In the following specific description, the description of matters and features common to the first embodiment shown in FIG. 1 will be omitted, and only differences will be described. In particular, the same effect of the same structure will not be mentioned one by one according to each embodiment. The same parts are marked with the same reference numeral in each drawing.

Next, only the differences between the second embodiment and the first embodiment shown in FIG. 1 above will be described in detail.

In this embodiment, the main difference from the image sensing apparatus 100 shown in FIG. 1 above is that in the image sensing apparatus 200 shown in this embodiment, the pixel 11 may also include a first buffer 113 and a first amplifier 114. The first buffer 113 may be a capacitor for storing the first electrical signal converted by the corresponding first photosensitive element 111, and the first amplifier 114 may be a TFT. Thus, the pixel 11 is an active pixel, and the image sensing apparatus 200 is an active image sensing device.

In some embodiments, the image sensing apparatus 200 may also include a second amplifier 13. Specifically, each data line ci corresponds to one amplifier 13. Each data line ci and a first end of the corresponding second amplifier 13 are coupled with the same port of the external control unit 20, and a second end of the second amplifier 13 is coupled with the corresponding second photosensitive element 12.

For example, one second photosensitive element 12 is provided. Referring to FIG. 2, for each second amplifier 13, a source (or a drain) of the second amplifier 13 and the corresponding data line ci are coupled with the same port of the external control unit 20, and a gate of the second amplifier 13 is coupled with the second photosensitive element 12.

In some embodiments, the image sensing apparatus 200 may also include a second buffer 14 coupled with the second photosensitive element 12 for storing the second electrical signal collected by the second photosensitive element 12.

In some embodiments, the second buffer 14 is in one-to-one correspondence with the second photosensitive element 12.

In some embodiments, a plurality of second photosensitive element 12 may be provided. For each second photosensitive element 12, the second photosensitive element 12 is connected to the same port with x data lines ci respectively.

In some embodiments, by selecting a suitable second amplifier 13, for example, by matching a voltage and size of the second amplifier 13 with the corresponding pixel 11, and adjusting the proportion relationship between the photosensitive area of the second photosensitive element 12 and the photosensitive area of the first photosensitive element 11, it may be ensured that the second electrical signal received by the same port can basically offset the ambient light signal in the first electrical signal.

In some embodiments, the data line ci is coupled with a row of pixels, However, in other embodiments, for the pixel array composed of the plurality of pixels 11, rows and columns are interchangeable. That is, for each data line ci, the data line ci may be coupled with a plurality of pixels 11 in a corresponding column.

In some embodiments, the external control unit 20 may be an integrated circuit (IC) for acquiring the electrical signals collected by the image sensing apparatus 200, and performing data processing to obtain the imaging of the signal light.

In some embodiments, the image sensing apparatus also includes an external control unit configured to receive the first electrical signal and the second electrical signal and to obtain a third electrical signal according to the first electrical signal and the second electrical signal, wherein the third electrical signal represents the signal light information.

Another embodiment of the present disclosure provides an image sensing apparatus. The image sensing apparatus includes an image sensor and an external control unit. The image sensor includes: a substrate; a plurality of pixels disposed in an array on the substrate, wherein each pixel includes a first photosensitive element and a pixel switch connected in series, and the first photosensitive element is configured to generate a first electrical signal including signal light information and ambient light information; and an environment sensor including at least one second photosensitive element, wherein the at least one second photosensitive element is configured to generate a second electrical signal including ambient light information. The external control unit is coupled with the image sensor and configured to receive the first electrical signal and the second electrical signal. The external control unit includes a processing unit to obtain a third electrical signal according to the first electrical signal and the second electrical signal, wherein the third electrical signal represents the signal light information.

The image sensing apparatus according to embodiments of the present disclosure can effectively eliminate the influence of ambient light on the image capturing and improve the imaging quality. Specifically, by making full use of the margin area outside the area where a pixel array is located on the substrate and disposing the at least one second photosensitive element for collecting the ambient light in the margin area, the image sensor can simultaneously output the first electrical signal including the signal light information and the second electrical signal containing only the ambient light information. Further, by setting the processing unit in the external control unit, the external control unit can correct the imaging result of the pixel array based on the second electrical signal, so as to effectively suppress the influence of the ambient light on the imaging result of the pixel array.

Figure 3:
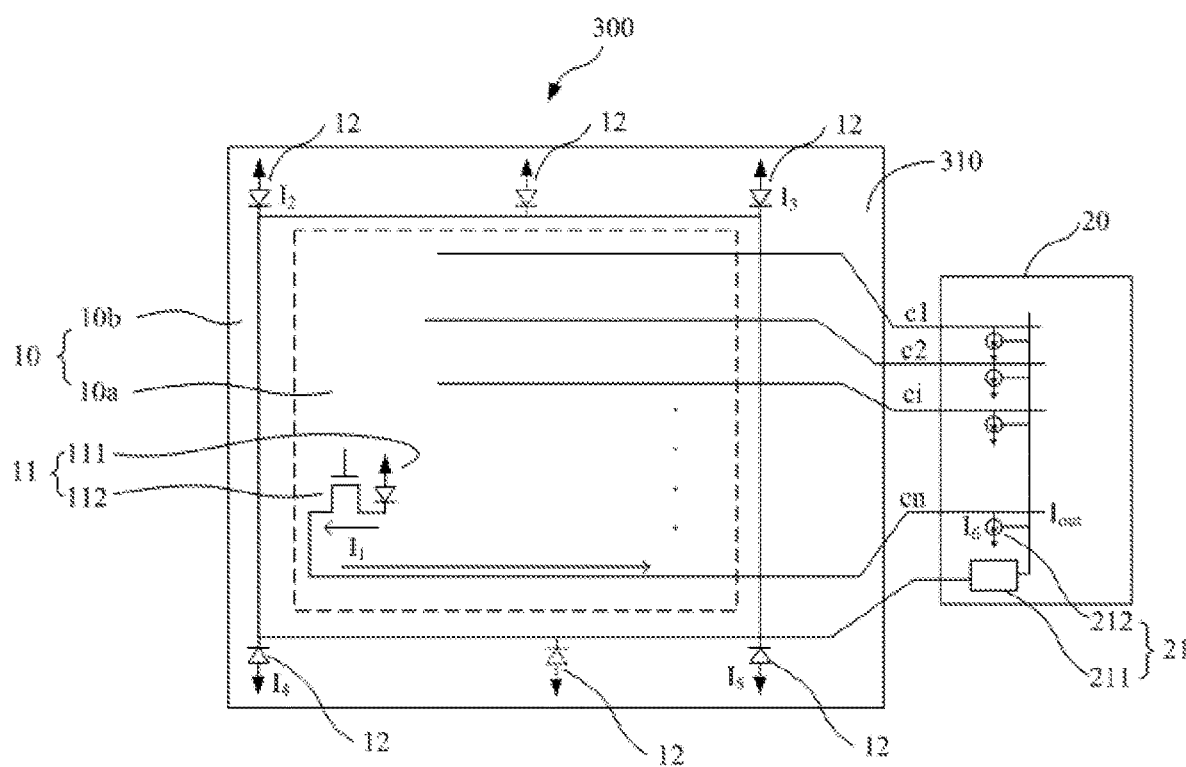
FIG. 3 shows a schematic view of an image sensing apparatus according to a third embodiment of the present disclosure.

FIG. 3 shows a schematic view of an image sensing apparatus 300 according to a third embodiment of the present disclosure. The image sensing apparatus 300 according to this embodiment can be applied to an image capturing scene, such as an optical fingerprint capturing scene. For example, the image sensing apparatus 300 may be an optical fingerprint sensor.

In order to show structures more clearly, FIG. 3 shows a specific structure of a single pixel in a pixel array as an example.

Specifically, the image sensing apparatus 300 according to the present embodiment may include an image sensor 310 and an external control unit 20. The image sensor 310 is used to convert the sensed light signal into an electrical signal and output the electrical signal, and the external control unit 20 is coupled with the image sensor 310 to receive the output signal of the image sensor 310, and obtains an image collected by the image sensor 310 based on processing of the output signal.

The image sensor 310 may include: a substrate 10, which may include a first area 10a and a second area 10b distributed on a same surface in parallel. The same surface may refer to the surface facing an object to be collected when capturing an image.

The image sensor 310 may also include a plurality of pixels 11 arranged in an array. The plurality of pixels 11 may be disposed in the first area 10a, each pixel 11 may include a first photosensitive element 111 and a pixel switch 112, and the first photosensitive element 111 and the pixel switch 112 are connected in series. The first photosensitive element 111 is configured to generate a first electrical signal, which includes signal light information and ambient light information.

The image sensing apparatus 300 may also include an environment sensor including at least one second photosensitive element 12, wherein the at least one second photosensitive element 12 may be disposed in the second area 10b. The second photosensitive element 12 is configured to generate a second electrical signal, and the second electrical signal includes ambient light information.

In some embodiments, the pixel switch 112 is usually a thin film transistor (TFT) device, and the photosensitive element is used to collect external input light signals and convert them into electrical signals, and then store them in corresponding pixels. In some embodiments, the light signal collected by the first photosensitive element 111 includes an ambient light signal and a signal light signal, and the collected light signals is converted into a first electrical signal and stored in the corresponding pixel 11. A light signal collected by the second photosensitive element 12 includes the ambient light signal, and the collected light signal is converted into a second electrical signal and output.

In the optical fingerprint capturing scene, the signal light signal carries fingerprint information.

In some embodiments, the first photosensitive element 111 and the second photosensitive element 12 may be photodiodes. The photodiodes may include PIN junction amorphous silicon photodiode, PN junction amorphous silicon photodiode, PIN junction low-temperature polysilicon photodiode, PN junction low-temperature polysilicon photodiode, PIN junction organic photodiode, or PN junction organic photodiode, etc.

In some embodiments, the output signal received by the external control unit 20 includes the first electrical signal and the second electrical signal.

The external control unit 20 may include a processing unit 21 for obtaining a third electrical signal according to the first electrical signal and the second electrical signal, and the third electrical signal represents the signal light information.

In some embodiments, the processing unit 21 may be an additional entity module dedicated to calculating the third electrical signal; or, the processing unit 21 may be integrated in the original signal receiving and processing module of the external control unit in the form of a program to obtain the third electrical signal according to the received first electrical signal and the second electrical signal.

In some embodiments, the image sensing apparatus 300 may also include a plurality of data lines (marked with c1 to cn in the figure). In each row of pixels 11, each pixel 11 is coupled with the same data line $c_i$, and the first electrical signal generated by the first photosensitive element 111 in each pixel 11 is transmitted to the data line $c_i$ through the pixel switch 112, and an output end of each data line $c_i$ is coupled with the external control unit 20, wherein $1 \leq i \leq n$, and i is a positive integer.

The output ends of different data lines $c_i$ are respectively coupled with different ports of the external control unit 20. Thus, the external control unit 20 can respectively receive the first electrical signal transmitted by each data line $c_i$, and transmit the received first electrical signal to the processing unit 21.

In some embodiments, the at least one second photosensitive element 12 may be respectively coupled with the processing unit 21 to transmit the second electrical signal generated by each second photosensitive element 12 to the processing unit 21.

In a variation, an output end of each second photosensitive element 12 may be coupled with a same port of the processing unit 21. At this time, the signal received by the processing unit 21 is a superimposed signal of the second electrical signal generated by each second photosensitive element 12. A superimposition refers to an accumulation of signals with plus and minus.

For example, a cathode (or an anode) of each second photosensitive element 12 may be coupled with the same port of the processing unit 21, so that the superimposed signal is the sum of each second electrical signal.

In some embodiments, the at least one second photosensitive element 12 may be uniformly distributed in the second area 10b to uniformly collect the ambient light signals at each point of the image sensor 310. As a result, the ambient light deducted from the third electrical signal can be much closer to the actual ambient light of the environment where the image sensor 310 is located, which is beneficial to improve the imaging quality.

In some embodiments, the second area 10b may surround the first area 10a. The environment sensor includes an even number of second photosensitive element 12, and the even number of second photosensitive elements 12 may be axially symmetrically distributed with respect to a center line of the second area 10b.

For example, the second area 10b may be all margin areas on the substrate 10 outside the first area 10a. Referring to FIG. 3, the first area 10a may be rectangular and located in the center of the substrate 10, and correspondingly, the second area 10b may be a rectangular frame area on the substrate 10 other than the first area 10a.

Still referring to FIG. 3, the center line can be parallel to adjacent right angle sides of the rectangle. Correspondingly, the number of the second photosensitive elements 12 may be four, and the four second photosensitive elements 12 are respectively located at four vertices of the rectangular frame area.

Alternatively, the number of the even number of the second photosensitive elements 12 may be 6 (two additional second photosensitive elements 12 are indicated by dotted lines in FIG. 3) or more, so as to collect the ambient light signals at various positions of the image sensor 310 more intensively. Further, it can also solve the problem that the correction result is inaccurate when the ambient light signal cannot be detected since a part of the second photosensitive element 12 is blocked.

The first area 10a and the second area 10B may have circular, elliptical or an axially symmetrical pattern, and the even number of the second photosensitive elements 12 may be symmetrically distributed with respect to a symmetrical axis of the axially symmetrical pattern, so as to ensure that the even number of the second photosensitive elements 12 are uniformly distributed in the image sensor 310, so as to collect the average ambient light signal of the image sensor 310.

For another example, the second area 10b and the first area 10a are n-polygon, the at least one second photosensitive element 12 may be disposed on each vertex of the n-polygon, and n is a positive integer greater than 2. For example, the second area 10b and the first area 10a are pentagon, the number of the second photosensitive elements 12 may be five, and the five second photosensitive elements are respectively disposed at the vertices of the pentagon formed by the second region 10b.

For another example, the second area 10b and/or the first area 10a may be an irregular pattern, and it can be ensured that the ambient light signals in each region of the image sensor 310 are uniformly collected by adjusting the setting position of each second photosensitive element 12.

Figure 4:
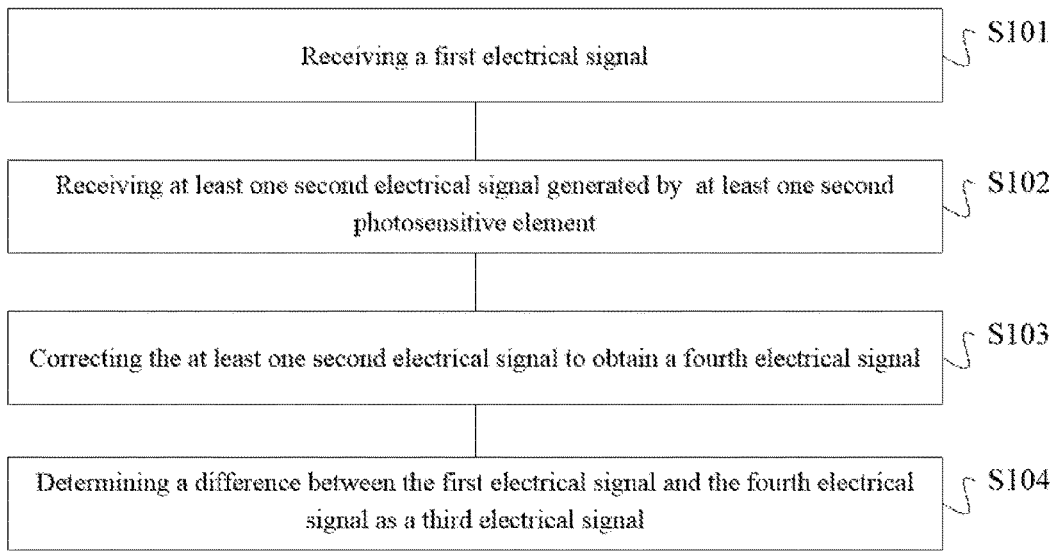
FIG. 4 shows a calculation flow diagram of a third electrical signal in the embodiment shown in FIG. 3.

In some embodiments, referring to FIG. 4, the external control unit obtaining the third electrical signal according to the first electrical signal and the second electrical signal:

S101, receiving the first electrical signal;

S102, receiving at least one second electrical signal generated by the at least one second photosensitive element;

S103, correcting the at least one second electrical signal to obtain a fourth electrical signal; and S104, determining a difference between the first electrical signal and the fourth electrical signal as the third electrical signal.

In some embodiments, S101 and S102 may be executed synchronously or asynchronously, and the execution sequence of S101 and S102 may be interchanged when executed asynchronously.

Figure 5:
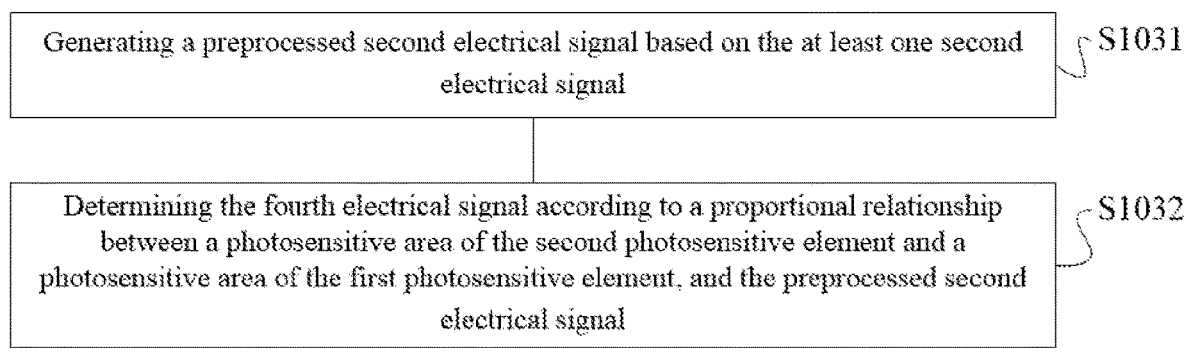
FIG. 5 shows a flow diagram of S103 shown in FIG. 4 according to one embodiment.

In some embodiments, referring to FIG. 5, S103 may include following steps:

S1031, generating a preprocessed second electrical signal based on the at least one second electrical signal;

S1032, determining the fourth electrical signal according to a proportional relationship between the photosensitive area of the second photosensitive element and the photosensitive area of the first photosensitive element, and the preprocessed second electrical signal.

For example, the processing unit 21 may include a controller 211 for analogue-to-digital conversion (ADC) and data operation of the at least one second electrical signal to integrate and process the at least one second electrical signal into an electrical signal proportional to the actual ambient light of the image sensor 310, and the electrical signal is the preprocessed second electrical signal.

In some embodiments, S1031 may include following steps: determining an average value of the at least one second electrical signal ($I_2$ to $I_5$ as shown in the figure) as the preprocessed second electrical signal. Thus, by integrating the ambient light signals collected by the second photosensitive elements 12 provided at different positions of the image sensor 310, an average ambient light signal of the image sensor 310 can be obtained to ensure the ambient light represented by the fourth electrical signal to be more close to the actual ambient light of the environment where the image sensor 310 is located, so as to ensure that the third electrical signal finally obtained by deduction can truly retain the signal light signal sensed by the image sensor 310, that is, no more deduction, or no ambient light signal remains.

In a variation, S1031 may include following step: determining a minimum value of the at least one second electrical signal as the preprocessed second electrical signal to avoid excessive correction to affect image quality.

In a variation, S1031 may include following step: determining the second electrical signal with the highest probability of occurrence among the at least one second electrical signal as the preprocessed second electrical signal, thereby avoiding overcorrection.

In some embodiments, S1032 may be expressed based on following formula:

$$I_{out} = I_1 - \alpha I_6;$$

wherein $I_{out}$ is the third electrical signal, $I_1$ is the first electrical signal, $\alpha$ is a proportional coefficient between the photosensitive area of the second photosensitive element 12 and the photosensitive area of the first photosensitive element 111, $I_6$ is the preprocessed second electrical signal, and $\alpha I_6$ is the fourth electrical signal.

In some embodiments, the second photosensitive element 12 and the first photosensitive element 111 may adopt photodiodes of different specifications, for example, the photosensitive area of the second photosensitive element 12 may be larger than that of the first photosensitive element 111, in order to reasonably reduce the number of the second photosensitive elements 12 and reduce costs, and ensure that the ambient light signals in different regions of the image sensor 310 are uniformly collected. The difference in the ambient light sensing results due to the different photosensitive areas can be corrected by the proportional relationship between the photosensitive area of the second photosensitive element 12 and the photosensitive area of the first photosensitive element 111, so that the fourth electrical signal can substantially eliminate the ambient light signal in the first electrical signal transmitted by the data line ci.

In some embodiments, the processing unit 21 may further include at least one current source 212 configured for receiving the fourth electrical signal. The at least one current source 212 may be in one-to-one correspondence with the plurality of data lines ci to receive the first electrical signal transmitted by the corresponding data line ci, and each current source 212 is coupled with the controller 211 to receive the fourth electrical signal.

For each data line ci, a photocurrent (i.e., the third electrical signal) finally output by the data line ci is a superimposed signal of the corresponding first electrical signal and the fourth electrical signal received by the corresponding current source 212, that is, the difference between the first electrical signal and the fourth electrical signal.

In a variation, the photosensitive area of the second photosensitive element 12 may be the same as the photosensitive area of the first photosensitive element 111, and correspondingly, the proportional coefficient $\alpha$ may be 1.

In a variation, the photosensitive areas of the second photosensitive elements 12 may be different. Correspondingly, the proportional coefficient $\alpha$ may be determined according to the average value of the photosensitive areas of the second photosensitive elements 12.

The image sensing apparatus according to embodiments of the present disclosure can effectively eliminate the influence of the ambient light on the image capturing and improve the imaging quality. Specifically, by making full use of the margin area outside the area where the pixel array is located on the substrate and disposing the at least one second photosensitive element for collecting the ambient light in the margin area, the image sensor 310 can simultaneously output the first electrical signal including the signal light information and the second electrical signal containing only the ambient light information. Further, by setting the processing unit 21 in the external control unit 20, the external control unit 20 can correct the imaging result of the pixel array based on the second electrical signal, so as to effectively suppress the influence of the ambient light on the imaging result of the pixel array.

Figure 6:
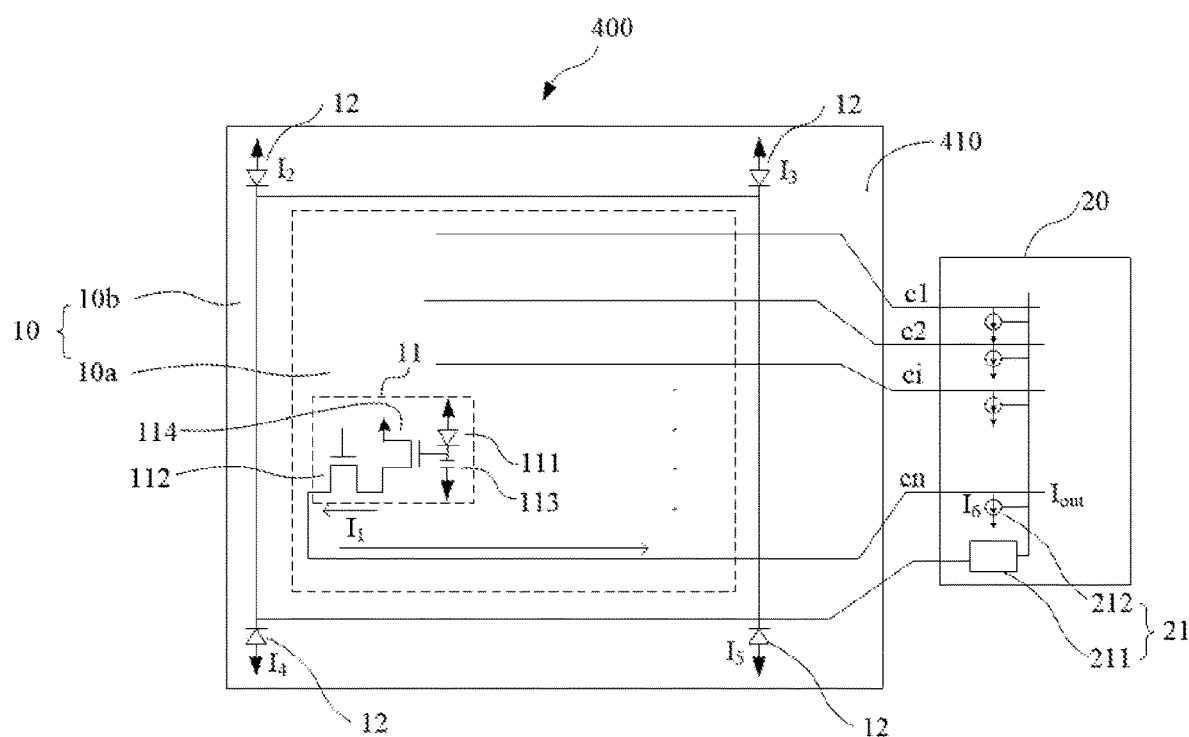
FIG. 6 shows a schematic view of an image sensing apparatus according to a fourth embodiment of the present disclosure.

FIG. 6 is a schematic view of an image sensing apparatus 400 according to a fourth embodiment of the present disclosure. In the following specific description, the description of matters and features common to the third embodiment shown in FIG. 3 will be omitted, and only differences will be described. In particular, the same effect of the same structure will not be mentioned one by one according to each embodiment. The same parts are marked with the same reference numeral in each drawing.

Next, only the differences between the fourth embodiment and the third embodiment shown in FIG. 3 above will be described in detail.

In this embodiment, the main difference from the image sensing apparatus 300 shown in FIG. 3 above is that in the image sensing apparatus 400 shown in this embodiment, each pixel 11 may also include a first buffer 113 and a first amplifier 114.

The first buffer 113 may be a capacitor for storing the first electrical signal converted by the corresponding first photosensitive element 111, and the first amplifier 114 may be a TFT. Thus, the pixel 11 is an active pixel, and an image sensor 410 is an active image sensor.

In some embodiments, each second photosensitive element 12 may be coupled with a second buffer (not show in the figure) and a second amplifier (not show in the figure) to buffer and amplify the second electrical signal.

Correspondingly, the processing unit 21 may comprehensively determine the proportional coefficient $\alpha$ according to factors such as the photosensitive area, the voltage and the size of the amplifier coupled with the second photosensitive element 12.

In some embodiments, the data line ci is coupled with a row of pixels, However, in other embodiments, for the pixel array composed of the plurality of pixels 11, rows and columns are interchangeable. That is, for each data line ci, the data line ci may be coupled with a plurality of pixels 11 in a corresponding column.

In some embodiments, the external control unit 20 may be an integrated circuit (IC).

In some embodiments, the number and photosensitive area of the second photosensitive elements 12 may be adjusted reasonably according to the shape and area of the second area 10b to ensure that the ambient light sensing range of the plurality of second photosensitive elements 12 can substantially cover the second area 10b, so as to effectively collect ambient light signals at different positions of the image sensor 410.

Figure 7:
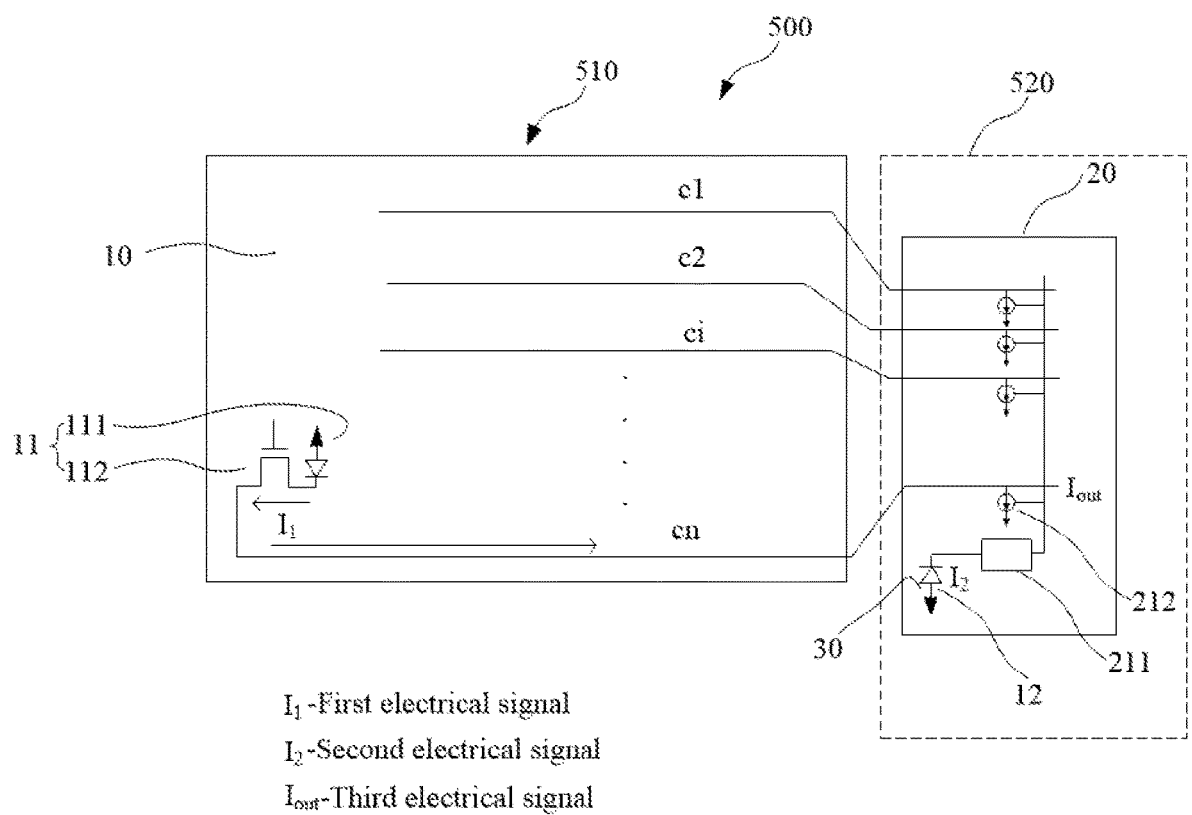
FIG. 7 shows a schematic view of an image sensing apparatus according to a fifth embodiment of the present disclosure.

FIG. 7 is a schematic view of an image sensing apparatus 500 according to a fifth embodiment of the present disclosure. The image sensing apparatus 500 includes an image sensor 510 and a signal collecting apparatus 520. The signal collecting apparatus 520 in this embodiment may be applied to image collection scenarios, such as optical fingerprint collection scenarios. The signal collecting apparatus 520 may be coupled with the image sensor 510 to receive image information collected by the image sensor 510. The image information may be an optical fingerprint image, and the image sensor 510 may be an optical fingerprint sensor.

Specifically, the signal collecting apparatus 520 in this embodiment may include: an external control unit 20 and an environment sensor 30. The external control unit 20 is configured to receive a first electrical signal generated by the image sensor 510, and the first electrical signal includes signal light information and ambient light information. The environment sensor 30 is configured to generate a second electrical signal, and the second electrical signal includes ambient light information. The external control unit 20 is also coupled with the environment sensor 30 to receive the second electrical signal, and obtain a third electrical signal according to the first electrical signal and the second electrical signal, and the third electrical signal represents the signal light information.

In some embodiments, the image sensor 510 may include a substrate 10 and a plurality of pixels 11 disposed in an array on the substrate 10. Each pixel 11 includes a first photosensitive element 111 and a pixel switch 112 connected in series, and the first photosensitive element 111 is configured to generate the first electrical signal.

In some embodiments, the image sensor 510 may also include n data lines (marked with c1 to n in the figure), and each pixel 11 in the same row is coupled with the same data line ci. The first electrical signal generated by the first photosensitive element 111 in each pixel 11 is transmitted to the data line ci through the pixel switch 112, and the output end of the data line ci is coupled with the external control unit 20, wherein 1≤i≤n, and i is a positive integer.

The output ends of different data lines ci are respectively coupled with different ports of the external control unit 20. Thus, the external control unit 20 can respectively receive and process the first electrical signal transmitted by each data line ci.

In some embodiments, the environment sensor 30 may include a second photosensitive element 12 for generating the second electrical signal.

In some embodiments, the pixel switch 112 is usually a thin film transistor (TFT) device, and the photosensitive element is used to collect external input light signals and convert them into electrical signals, and then store them in corresponding pixels. In some embodiments, the light signal collected by the first photosensitive element 111 includes an ambient light signal and a signal light signal, and the collected light signals are converted into a first electrical signal and stored in the corresponding pixel 11. A light signal collected by the second photosensitive element 12 includes the ambient light signal, and the collected light signal is converted into a second electrical signal and output. In the optical fingerprint capturing scene, the signal light signal carries fingerprint information.

In some embodiments, the first photosensitive element 111 and the second photosensitive element 12 may be photodiodes. The photodiodes may include PIN junction amorphous silicon photodiode, PN junction amorphous silicon photodiode, PIN junction low-temperature polysilicon photodiode, PN junction low-temperature polysilicon photodiode, PIN junction organic photodiode, or PN junction organic photodiode, etc.

In some embodiments, the external control unit 20 and the environment sensor 30 may be formed on a same chip. Therefore, by fine-tuning the original signal collecting apparatus 520 for reading and processing the output signal of the image sensor 510, the influence of the ambient light on the imaging result can be effectively corrected, thereby obtaining a higher-quality image. Further, the signal collecting apparatus 520 in this embodiment may be compatible with existing image sensors, thus it does not need to improve the image sensor 510 additionally, thus the implementation cost is relatively low.

For example, the environment sensor 30 may be formed on an existing control chip for reading and processing the image signal collected by the image sensor 510 to obtain the second electrical signal, and to correct the first electrical signal based on the second electrical signal to obtain the third electrical signal.

In some embodiments, referring to FIG. 7, there is one second photosensitive element 12. The external control unit 20 may include a controller 211 for data processing operations of the second electrical signal generated by the second photosensitive element 12, such as Analogue-to-Digital Conversion (ADC).

Figure 8:
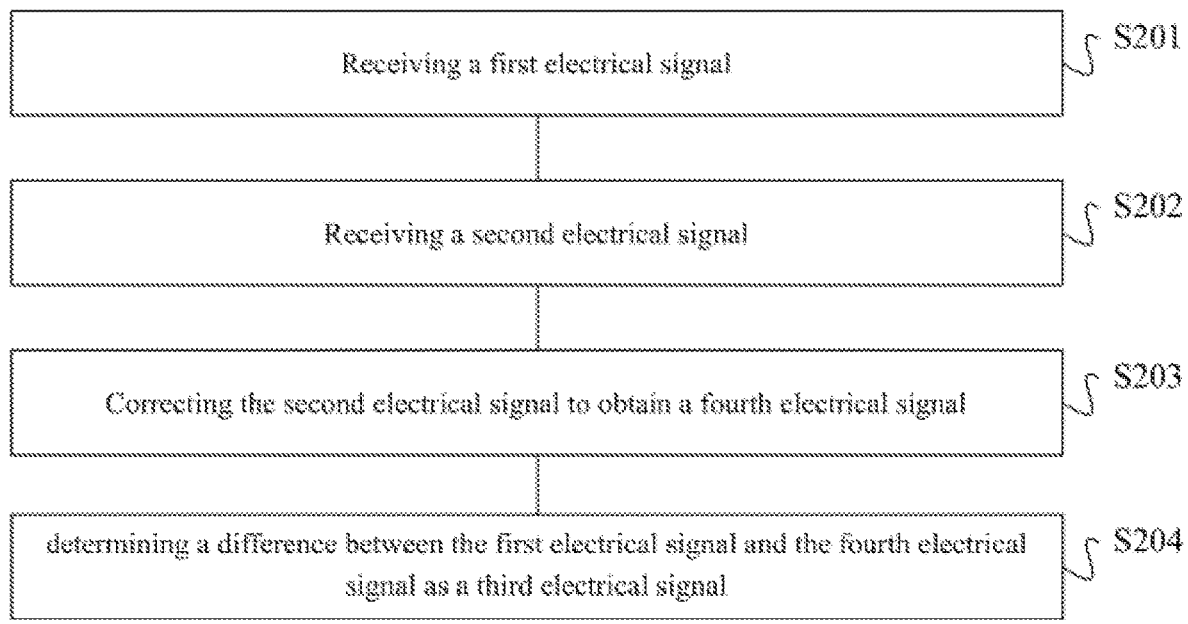
FIG. 8 shows a calculation flow diagram of a third electrical signal in the embodiment shown in FIG. 7.

In some embodiments, referring to FIG. 8, the external control unit obtaining the third electrical signal according to the first electrical signal and the second electrical signal includes:

S201, receiving the first electrical signal;
S202, receiving the second electrical signal;
S203, correcting the second electrical signal to obtain a fourth electrical signal;
S204, determining a difference between the first electrical signal and the fourth electrical signal as the third electrical signal.

In some embodiments, S201 and S202 may be executed synchronously or asynchronously, and the execution sequence of S201 and S202 may be interchanged when executed asynchronously.

In some embodiments, S203 may include following step: determining the fourth electrical signal according to a proportional relationship between the photosensitive area of the second photosensitive element and the photosensitive area of the first photosensitive element, and the second electrical signal.

For example, the third electrical signal may be calculated based on following formula:

$$I_{out} = I_1 - \alpha I_2;$$

wherein $I_{out}$ is the third electrical signal, $I_1$ is the first electrical signal, α is a proportional coefficient between the photosensitive area of the second photosensitive element 12 and the photosensitive area of the first photosensitive element 111, $I_2$ is the second electrical signal, and $αI_2$ is the fourth electrical signal.

In some embodiments, the second photosensitive element 12 and the first photosensitive element 111 may adopt photodiodes of different specifications, for example, the photosensitive area of the second photosensitive element 12 may be larger than that of the first photosensitive element 111, in order to ensure that the ambient light signals in different regions of the image sensor 310 are effectively collected. The difference in the ambient light sensing results due to the different photosensitive areas can be corrected by the proportional relationship between the photosensitive area of the second photosensitive element 12 and the photosensitive area of the first photosensitive element 111, so that the fourth electrical signal can substantially eliminate the ambient light signal in the first electrical signal transmitted by the data line ci.

In some embodiments, the external control unit 20 may further include at least one current source 212 configured for receiving the fourth electrical signal. The at least one current source 212 may be in one-to-one correspondence with plurality of data lines ci to receive the first electrical signal transmitted by the corresponding data line ci, and each current source 212 is coupled with the controller 211 to receive the fourth electrical signal.

For each data line ci, a photocurrent (i.e., the third electrical signal) finally output by the data line ci is a superimposed signal of the corresponding first electrical signal and the fourth electrical signal received by the corresponding current source 212, that is, the difference between the first electrical signal and the fourth electrical signal.

In a variation, the photosensitive area of the second photosensitive element 12 may be the same as the photosensitive area of the first photosensitive element 111, and correspondingly, the proportional coefficient α may be 1.

In some embodiments, there is a preset distance between the external control unit 20 and the substrate 10 of the image sensor 510. In some embodiments, a distance between the environment sensor 30 and the substrate 10 of the image sensor 510 is no more than 5 cm, in order to ensure that the second photosensitive element 12 can effectively collect the ambient light signal of the environment where the image sensor 510 is located.

From the above, this embodiment can effectively eliminate the influence of the ambient light on the image capturing and improve the imaging quality. Specifically, without changing the device structure of the existing image sensor 510, the environment sensor 30 may be added to separately collect the ambient light to correct the first electrical signal output by the image sensor 510, thereby suppressing the influence of the ambient light on the image captured by the image sensor 510.

Figure 9:
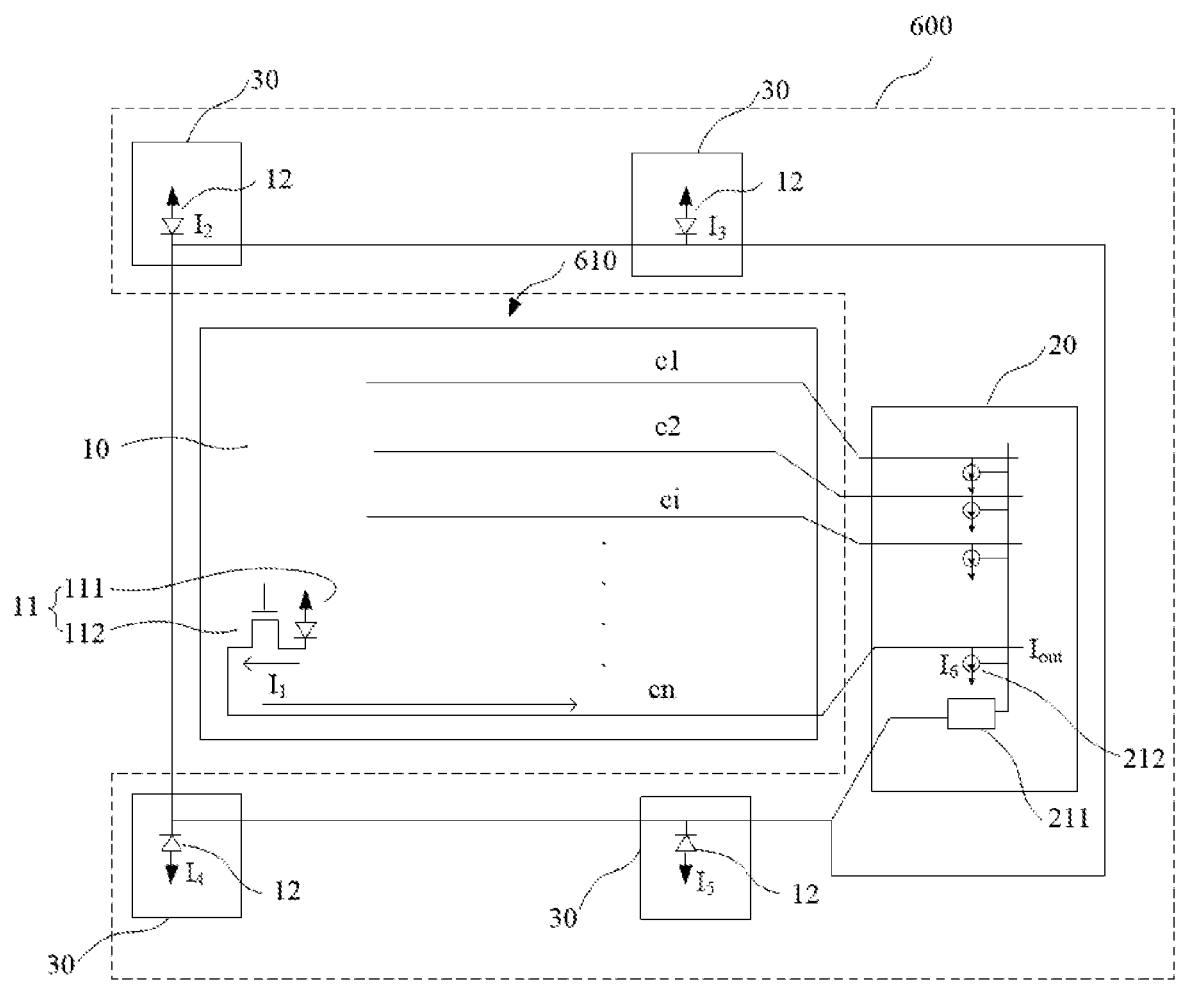
FIG. 9 shows a schematic view of an image sensing apparatus according to a sixth embodiment of the present disclosure.

FIG. 9 is a schematic view of an image sensing apparatus 600 according to a sixth embodiment of the present disclosure. In the following specific description, the description of matters and features common to the fifth embodiment shown in FIG. 7 will be omitted, and only differences will be described. In particular, the same effect of the same structure will not be mentioned one by one according to each embodiment. The same parts are marked with the same reference sign in each drawing.

Next, only the differences between the sixth embodiment and the fifth embodiment shown in FIG. 7 will be described in detail.

In this embodiment, the main difference from the image sensing apparatus 500 shown in FIG. 7 is that the environmental sensor 30 and the external control unit 20 are formed on different chips.

For example, in an application scenario of optical fingerprint recognition on a smart terminal such as a mobile phone, the environment sensor 30 may reuse an existing ambient light sensing unit on the mobile phone, and the external control unit 20 is coupled with ambient light sensing unit to receive the second electrical signal and correct the first electrical signal collected by the image sensor based on the second electrical signal.

In some embodiments, when the environment sensor 30 reuses an existing module on the smart terminal, the environment sensor 30 may include a plurality of second photosensitive elements 12.

Further, the plurality of second photosensitive elements 12 may be distributed at different positions on the plane where an image sensor 610 is located. For example, the plurality of second photosensitive elements 12 may be disposed around the image sensor 610 to uniformly and comprehensively collect ambient light signals of the environment where the image sensor 610 is located.

Figure 10:
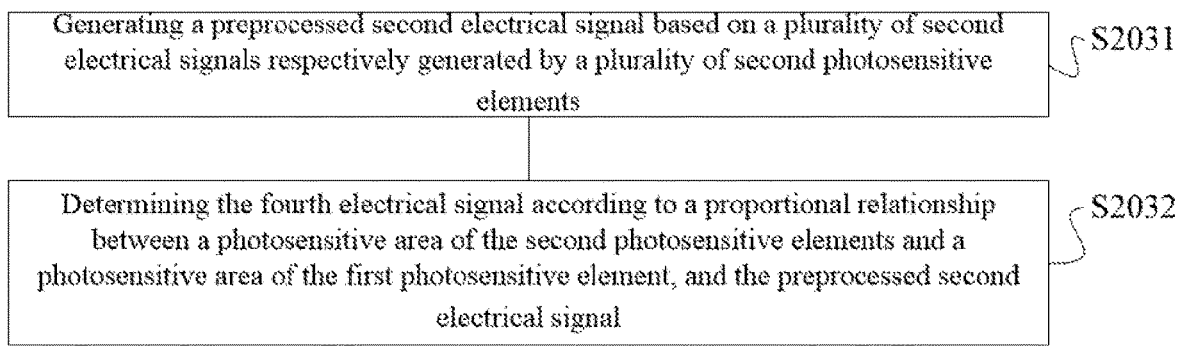
FIG. 10 shows a flow diagram of S203 shown in FIG. 8 according to one embodiment.

In some embodiments, referring to FIG. 10, S203 may include following steps:

S2031, generating a preprocessed second electrical signal based on a plurality of second electrical signals respectively generated by the plurality of second photosensitive elements 12; and S1032, determining the fourth electrical signal according to a proportional relationship between the photosensitive area of the second photosensitive elements and a photosensitive area of the first photosensitive element, and the preprocessed second electrical signal.

For example, the controller 211 may be used for analogue-to-digital conversion (ADC) and data operation of the at least one second electrical signal to integrate and process the second electrical signals into an electrical signal proportional to the actual ambient light of the image sensor 610, and the electrical signal is the preprocessed second electrical signal.

In some embodiments, S2031 may include following steps: determining an average value of the plurality of second electrical signals (12 to 5 as shown in the figure) as the preprocessed second electrical signal. Thus, by integrating the ambient light signals collected by the second photosensitive elements 12 provided at different positions at the periphery of the image sensor 610, the average ambient light signal of the image sensor 610 can be obtained to ensure the ambient light represented by the fourth electrical signal to be more close to the actual ambient light of the environment where the image sensor 610 is located, so as to ensure that the third electrical signal finally obtained by deduction can truly retain the signal light signal sensed by the image sensor 610, that is, no more deduction, or no ambient light signal remains.

In a variation, S2031 may include following step: determining a minimum value of the plurality of second electrical signals as the preprocessed second electrical signal to avoid excessive correction to affect image quality.

In a variation, S2031 may include following step: determining the second electrical signal with the highest probability of occurrence among the plurality of second electrical signal as the preprocessed second electrical signal, thereby avoiding overcorrection.

In some embodiments, S2032 may be expressed based on following formula:

$$I_{out} = I_1 - \alpha I_6;$$

wherein $I_{out}$ is the third electrical signal, $I_1$ is the first electrical signal, α is a proportional coefficient between the photosensitive area of the second photosensitive element 12 and the photosensitive area of the first photosensitive element 111, $I_6$ is the preprocessed second electrical signal, and $\alpha I_6$ is the fourth electrical signal.

In a variation, the photosensitive areas of the second photosensitive elements 12 may be different. Correspondingly, the proportional coefficient α may be determined according to the average value of the photosensitive areas of the second photosensitive elements 12.

Figure 11:
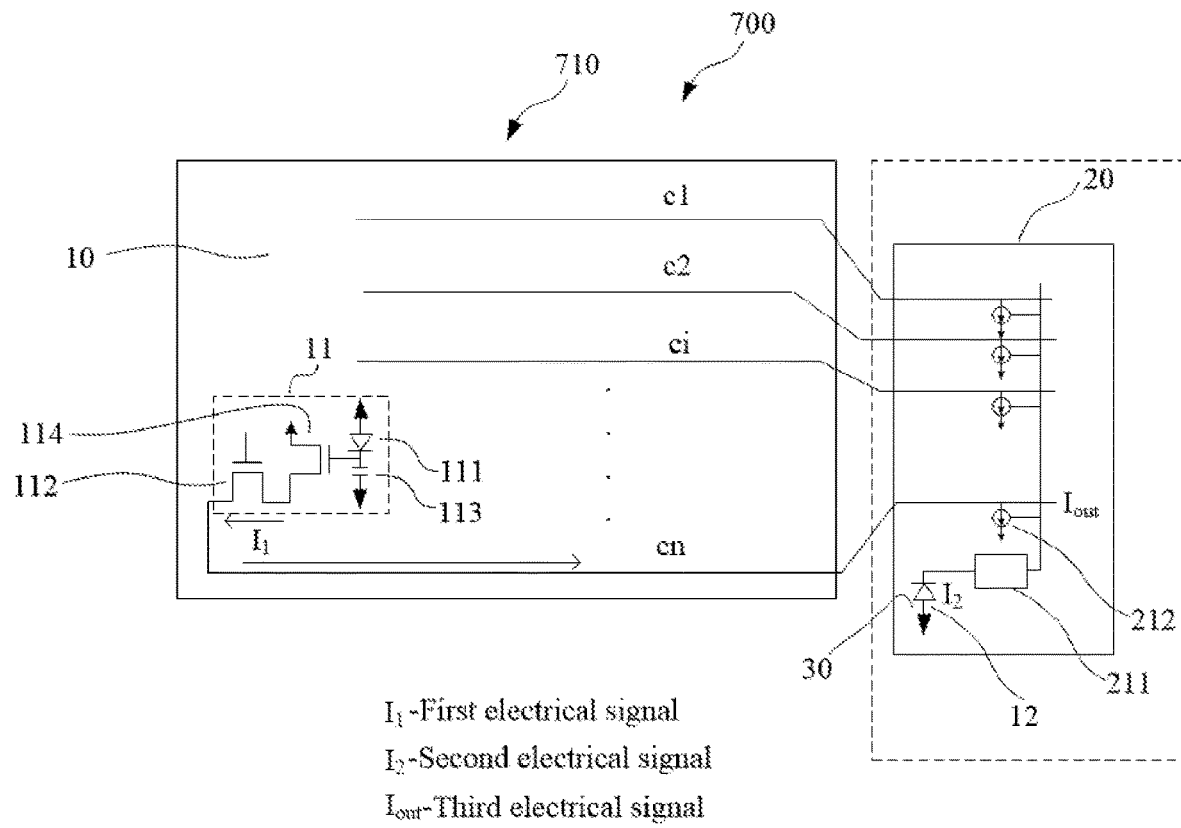
FIG. 11 shows a schematic view of an image sensing apparatus according to a seventh embodiment of the present disclosure.

FIG. 11 is a schematic view of an image sensing apparatus 700 according to a seventh embodiment of the present disclosure.

In this embodiment, the main difference from the image sensing apparatus 500 shown in FIG. 7 and the image sensing apparatus 600 shown in FIG. 9 is that each pixel 11 may also include the first buffer 113 and the first amplifier 114 other than the first photosensitive element 111 and the pixel switch 112.

The first buffer 113 can be a capacitor for storing the first electrical signal converted by the corresponding first photosensitive element 111, and the first amplifier 114 may be a TFT. Thus, the pixel 11 is an active pixel, and an image sensor 710 is an active image sensor.

In some embodiments, each second photosensitive element 12 may be coupled with a second buffer (not show in the figures) and a second amplifier (not show in the figures) to buffer and amplify the second electrical signal.

Correspondingly, the external control unit 20 may comprehensively determine the proportional coefficient α according to factors such as the photosensitive area, the voltage and the size of the amplifier coupled with the second photosensitive element 12.

In the above embodiment, the data line ci is coupled with a row of pixels, However, In some embodiments, for the pixel array composed of the plurality of pixels 11, rows and columns are interchangeable. That is, for each data line ci, the data line ci may be coupled with a plurality of pixels 11 in a corresponding column.

In some embodiments, the external control unit 20 may be an integrated circuit (IC).

Although the present disclosure has been disclosed above, the present disclosure is not limited thereto. Any changes and modifications may be made by those skilled in the art without departing from the spirit and scope of the present disclosure, and the scope of the present disclosure should be determined by the appended claims.

The invention claimed is:

1. An image sensing apparatus, comprising:
   a substrate;
   a plurality of pixels disposed in an array on the substrate, wherein each pixel comprises a first photosensitive element and a pixel switch, and the first photosensitive element is configured to generate a first electrical signal comprising signal light information and ambient light information; and
   an environment sensor comprising at least one second photosensitive element, wherein the at least one second photosensitive element is configured to generate a second electrical signal comprising ambient light information;
   wherein the image sensing apparatus further comprises:
   an external control unit, configured to:
      receive the first electrical signal and the second electrical signal and to obtain a third electrical signal according to the first electrical signal and the second electrical signal, wherein the third electrical signal represents the signal light information; or
      receive a superimposed signal of the first electrical signal and at least a part of the second electrical signal, wherein the superimposed signal comprises a difference between the first electrical signal and at least a part of the second electrical signal, so that the ambient light information in the second electrical signal collected by the at least one second photosensitive element basically eliminates the ambient light information in the first electrical signal collected by the first photosensitive element.

2. The image sensing apparatus according to claim 1, wherein the substrate comprises a first area and a second area on a same surface, the plurality of pixels are disposed in the first area, and the at least one second photosensitive element is disposed in the second area.

3. The image sensing apparatus according to claim 2, wherein the second area is disposed at one side of the first area.

4. The image sensing apparatus according to claim 2, wherein the second area surrounds the first area.

5. The image sensing apparatus according to claim 4, wherein
   the environment sensor comprises an even number of second photosensitive elements, and the even number of second photosensitive elements are axially symmetrically distributed with respect to a center line of the second area; or
   the second area and the first area are n-polygon, the at least one second photosensitive element is disposed on each vertex of the n-polygon, and n is a positive integer greater than 2.

6. The image sensing apparatus according to claim 2, wherein the at least one second photosensitive element is uniformly distributed in the second area.

7. The image sensing apparatus according to claim 2, further comprising:
   a plurality of data lines, wherein each data line is coupled with the pixels in a same row, and the first electrical signal generated by the first photosensitive element in each pixel is transmitted to the data line via the pixel switch.

8. The image sensing apparatus according to claim 7, wherein there is a correspondence relationship between the plurality of data lines and the at least one second photosensitive element, each data line and its corresponding second photosensitive element are coupled with a same port of an external control unit, and a signal received by the same port of the external control unit is the superimposed signal of the first electrical signal and at least a part of the second electrical signal.

9. The image sensing apparatus according to claim 8, wherein different data lines are coupled with different ports of the external control unit.

10. The image sensing apparatus according to claim 8, wherein the at least one second photosensitive element is in one-to-one correspondence with the plurality of data lines, and the signal received by the same port of the external control unit is a superimposed signal of the first electrical signal and the second electrical signal.

11. The image sensing apparatus according to claim 10, wherein a photosensitive area of the first photosensitive element is the same as a photosensitive area of the second photosensitive element corresponding to the same data line.

12. The image sensing apparatus according to claim 8, wherein each second photosensitive element corresponds to x data lines, and the signal received by the same port of the external control unit is a superimposed signal of the first electrical signal and 1/x of the second electrical signal.

13. The image sensing apparatus according to claim 12, wherein a photosensitive area of each second photosensitive element is a product of a photosensitive area of the first photosensitive element and the number of the plurality of data lines corresponding to each second photosensitive element.

14. The image sensing apparatus according to claim 1, wherein each pixel further comprises a first buffer and a first amplifier coupled with the first photosensitive element to buffer and amplify the first electrical signal.

15. The image sensing apparatus according to claim 14, wherein the environment sensor further comprises a second buffer and a second amplifier coupled with the at least one second photosensitive element to buffer and amplify the second electrical signal.

16. The image sensing apparatus according to claim 1, further comprising:
a plurality of data lines, wherein each data line is coupled with the pixels in a same row, and the first electrical signal generated by the first photosensitive element in each pixel is transmitted to the data line via the pixel switch, and an output end of each data line is coupled with the external control unit.

17. The image sensing apparatus according to claim 1, wherein the at least one second photosensitive element is respectively coupled with the external control unit.

18. The image sensing apparatus according to claim 1, wherein the external control unit and the environment sensor are formed on a same chip.

19. The image sensing apparatus according to claim 18, wherein the external control unit is disposed at a preset distance from the substrate.

20. The image sensing apparatus according to claim 1, wherein the external control unit and the environment sensor are formed on different chips.

21. The image sensing apparatus according to claim 1, wherein the external control unit obtaining the third electrical signal according to the first electrical signal and the second electrical signal comprises:
receiving the first electrical signal;
receiving the second electrical signal;
correcting the second electrical signal to obtain a fourth electrical signal; and
determining a difference between the first electrical signal and the fourth electrical signal as the third electrical signal.

22. The image sensing apparatus according to claim 21, wherein correcting the second electrical signal to obtain the fourth electrical signal comprises:
determining the fourth electrical signal according to a proportional relationship between a photosensitive area of the at least one second photosensitive element and a photosensitive area of the first photosensitive element, and the second electrical signal.

23. The image sensing apparatus according to claim 21, wherein the environment sensor comprises a plurality of second photosensitive elements, and correcting the second electrical signal to obtain the fourth electrical signal comprises:
generating a preprocessed second electrical signal based on a plurality of second electrical signals generated by the plurality of second photosensitive elements; and
determining the fourth electrical signal according to a proportional relationship between a photosensitive area of the second photosensitive elements and a photosensitive area of the first photosensitive element, and the preprocessed second electrical signal.

24. The image sensing apparatus according to claim 23, wherein generating the preprocessed second electrical signal based on the second electrical signal generated by each second photosensitive element comprises:
determining an average value of the plurality of second electrical signals as the preprocessed second electrical signal; or,
determining a minimum value among the plurality of second electrical signals as the preprocessed second electrical signal; or,
determining the second electrical signal with a highest probability of occurrence among the plurality of second electrical signals as the preprocessed second electrical signal.

25. The image sensing apparatus according to claim 21, wherein the external control unit further comprises at least one current source configured for receiving the fourth electrical signal.

26. The image sensing apparatus according to claim 25, further comprising:
a plurality of data lines, wherein each data line is couple with the pixels in a same row, the first electrical signal generated by the first photosensitive element in each pixel is transmitted to the data line via the pixel switch, and an output end of each data line is coupled with a port of the external control unit, and wherein the at least one current source is in one-to-one correspondence with the plurality of data lines to receive the first electrical signal transmitted by corresponding data line, and an optical current output by each data line to corresponding port is a superimposed signal of corresponding first electrical signal and the fourth electrical signal received by corresponding current source.

\* \* \* \* \*